United States Patent
Priepke (10) Patent No.: US 7,264,068 B2
(45) Date of Patent: Sep. 4, 2007

(54) STEERING CONTROL SYSTEM FOR A SKID STEER VEHICLE

(75) Inventor: Edward H. Priepke, Lancaster, PA (US)

(73) Assignee: CNH America LLC, New Holland, PA (US)

(*) Notice: Subject to any disclaimer, the term of this patent is extended or adjusted under 35 U.S.C. 154(b) by 201 days.

(21) Appl. No.: 10/939,777

(22) Filed: Sep. 13, 2004

(65) Prior Publication Data

US 2006/0054366 A1    Mar. 16, 2006

(51) Int. Cl.
B60K 17/30 (2006.01)
B60K 17/34 (2006.01)

(52) U.S. Cl. ............... 180/6.24; 180/6.26; 180/6.3; 180/6.48

(58) Field of Classification Search ............... 180/6.24, 180/6.26, 6.3, 6.48
See application file for complete search history.

(56) References Cited

U.S. PATENT DOCUMENTS

| 163,681 A | 5/1875 | Milliken |
|---|---|---|
| 756,992 A | 4/1904 | Twitchell |
| 1,172,866 A | 2/1916 | Blevins |
| 1,891,578 A | 12/1932 | Reed |
| 2,105,781 A | 1/1938 | Dixon |
| 2,354,830 A | 8/1944 | Reid |
| 3,198,541 A | 8/1965 | Christenson et al. |
| 4,353,284 A | 10/1982 | Billottet et al. |
| 4,778,023 A * | 10/1988 | Sugasawa ............... 180/415 |
| 5,090,512 A | 2/1992 | Mullet et al. |
| 5,727,644 A | 3/1998 | Roberts et al. |
| 6,354,394 B1 | 3/2002 | Bauer-Nilsen |
| 6,491,131 B1 | 12/2002 | Appleyard |
| 6,766,236 B1 * | 7/2004 | Lamela et al. ............ 701/50 |
| 2002/0153188 A1 | 10/2002 | Brandt et al. |

OTHER PUBLICATIONS

Edward H. Priepke, U.S. Appl. No. 10/869,274, filed Jun. 16, 2004.

* cited by examiner

Primary Examiner—Lesley D. Morris
Assistant Examiner—Marlon Arce-Diaz
(74) Attorney, Agent, or Firm—Michael G. Harms; John William Stader (57) ABSTRACT

A skid steer vehicle has a steering controller that monitors the speeds of the left and right wheels and steers those wheels in directions that are calculated to reduce, eliminate or minimize wheel skidding with respect to the ground while the vehicle is turning.

20 Claims, 8 Drawing Sheets

STEERING CONTROL SYSTEM FOR A SKID STEER VEHICLE

FIELD OF THE INVENTION

The present invention generally relates to skid steer vehicles. More particularly, it relates to steering systems for wheel steering skid steer vehicles. Even more particularly, it relates to steering control systems for skid steer vehicles.

BACKGROUND OF THE INVENTION

This application describes steering actuators that are also described in a previously filed co-pending application entitled "Steering Actuator for a Skid Steer Vehicle" (U.S. patent application Ser. No. 10/869,274) that is invented by the same inventor and is assigned to the same assignee as the present application.

This application and the '274 application both disclose a steering actuator arrangement. This application also discloses a control system that that is not disclosed in the '274 application and to which the claims of the present application are generally directed.

Skid steer vehicles such as skid steer loaders are a mainstay of construction work. In their most common configuration, they have two drive wheels on each side of a chassis that are driven in rotation by one or more hydraulic motors coupled to the wheels on one side and another one or more hydraulic motors coupled to the wheels on the other side.

The wheels on one side of the vehicle can be driven independently of the wheels on the other side of the vehicle. This permits the wheels on opposing sides of the vehicle to be rotated at different speeds, in opposite directions, or both. By rotating in opposite directions, the skid steer can rotate in place about a vertical axis that extends through the vehicle itself.

The vehicles have an overall size of about 4×8' to 7×12' feet which, when combined with their ability to rotate in place, gives them considerable mobility at a worksite. This mobility makes them a preferred vehicle.

Skid steer vehicles commonly have at least one loader lift arm that is pivotally coupled to the chassis of the vehicle to raise and lower at the operator's command. This arm typically has a bucket, blade, or other implement attached to the end of the arm that is lifted and lowered thereby. Perhaps most commonly, a bucket is attached to the arm and the skid steer vehicle. This bucket is commonly used to carry supplies or particulate matter such as gravel, sand, or dirt around a worksite.

Skid steering provides its own problems. First, skidding tears the terrain over which the vehicle travels. The tighter the vehicle skid steers, the more damage to the ground it causes. A skid steer vehicle that turns in place can actually dig ruts into loose soil. Skid steer vehicles operated in close quarters rapidly denude soil by literally scrubbing the ground clean of grass and other plant matter.

The problems with skid steering have limited the use of skid steer vehicles to construction sites, road construction sites and other locations where there is no topsoil or plant matter to damage.

To answer the need for less ground-damaging vehicles, skid steer vehicles have been devised that provide limited steering of the drive wheels with respect to the chassis.

These skid steer vehicles have four wheels pivotable with respect to the chassis by four hydraulic cylinders. The cylinders are hydraulically coupled such that a single hydraulic valve is capable of simultaneously steering all four suspensions at once. When hydraulic fluid flows in a first direction, the front wheels are steered to the left and the rear wheels are steered to the right. When hydraulic fluid flows in the opposite direction, the front wheels are steered to the right and the rear wheels are steered to the left.

There are some limitations to this arrangement, however.

First, skid steer vehicles are controlled in a manner incompatible with wheel steering. It is difficult to adapt skid steer controls to a vehicle that wheel steers.

Traditional skid steer vehicles typically use twin levers located on either side of the vehicle to both move and steer. The lever on one side controls the speed and direction of the wheels on the left side of the vehicle. The lever on the right side of the vehicle controls the speed and direction of the wheels on the right side of the vehicle. Push the lever on one side of the vehicle forward, and the wheels on that side of the vehicle rotate forward, pull the lever back, and the wheels rotate backward. The farther you push (or pull) the lever, the faster the wheels turn. Thus, the two levers simultaneously control speed, direction of turning, and direction of rotation.

Manufacturers have recently developed skid steer vehicles that use a single joystick for all three functions. The operator pushed the joystick straight ahead to go straight forward. The vehicle controller responsively drives all four wheels forward at the same speed. The speed is proportional to how far forward the driver pushes the joystick. To go straight backwards, the operator pulls the joystick backwards. Speed is proportional to how far back the joystick is pulled.

To turn toward the right or left while traveling forward or backward, the operator pushes (forward travel) or pulls (backward travel) the joystick, while also pulling it to the left or right.

To skid steer (in place) to the left, the operator tilts the joystick to the left but does not push or pull on the joystick. To skid steer (in place) to the right, the operator tilts the joystick to the right but does not push or pull on the joystick.

Thus, the newer joystick-equipped vehicle use a single operator input device for steering angle (left/right), direction (forward/backward) and vehicle speed.

In automobiles and trucks with wheel steering, however, the operator selects a desired steering angle with one device: a steering wheel. He selects the vehicle speed with another device: a gas pedal. He selects the vehicle direction of travel with a third device: a shift lever. Thus, each parameter of travel—steering angle, direction and speed—is controlled by its own separate operator input device.

Incorporating wheel steering into a lever or joystick system is difficult. As a practical matter, a steering wheel cannot be used in addition to or in place of the two levers or the joystick. The wheels must be steered using the lever and joystick commands.

Second, it is difficult to change a skid steer vehicle over from skid steering to wheel steering without changing the way the vehicle responds to the operator's steering commands.

After hours, days, months and years of use, a vehicle operator learns to anticipate the movement of a vehicle in response to his operation of the controls. He drives a vehicle almost automatically, anticipating its every response before it occurs. Operating the vehicle, in that sense, is much like playing a musical instrument. Any change in the way a vehicle responds to its controls is jarring at the least. If it is too different, it may reduce the driver's productivity to that of a beginner. Imagine, for example, a car with reversed steering: when you turn the steering wheel to the left the car turns right right, and vice versa. It could easily take months to unlearn one's automatic reactions.

Adding wheel steering to a skid steer vehicle poses the same problem. When the driver moves the levers a certain distance he expects the vehicle to respond identically. If it does not, he may get confused, become unsure of himself, and resist operating the vehicle, depending upon the degree the vehicle's response has changed. Adding wheel steering to a skid steered vehicle requires the careful tailoring of steering response. This is not a trivial task.

Third, it is difficult to change over automatically from skid steering to wheel steering in the same vehicle without radically changing the response. Under ideal circumstance, wheel steering should completely substitute for skid steering, and that wheel steering should "feel" the same to the driver as the skid steering "feels". The response should be identical.

There are times, however, when the system must change from one mode to another. When the operator is driving rapidly along flat ground in one direction, in theory it should be relatively easy to either steer the vehicle by skid steering or by wheel steering. However, it is unclear how the vehicle should respond when the operator brings it to a halt and then commands it to turn in place. Turning in place or any other form of turning that is too sharp for the wheel steering alone to accommodate requires some skid steering in addition to wheel steering.

Designers of skid steer vehicles that provide both skid steering and wheel steering face these problems. Designers of vehicles that steer both by skidding and by wheel steering and use dual levers or joysticks that separately and independently drive wheels on opposite sides of the vehicle face these problems.

An object of this invention is to provide a smooth transition from a wheel steering to a skid steering mode of operation for these types of vehicles. It is also an object of this invention to provide a steering system for a skid steer vehicle that provides the same response in a wheel steering mode as it does in skid steering mode. It is also an object of this invention to provide a control system for a skid steer vehicle that receives commands from a two lever or joystick arrangement and translates them into wheel steering commands

SUMMARY OF THE INVENTION

In accordance with a first aspect of the invention, a steering control system for a skid steer vehicle having wheels is provided, including means for skid steering the wheels of the skid steer vehicle in a skid steering mode of operation; and means for wheel steering the wheels of the skid steer vehicle in a wheel steering mode of operation; wherein the means for wheel steering is responsive to the speeds of the wheels to determine a preferred angle of wheel steering.

The means for wheel steering may include means for sensing the speed of the wheels. The means for sensing the speeds of the wheels may include means for determining the speed of at least one wheel on one side of the vehicle and for sensing a different speed of another wheel on the other side of the vehicle. The means for wheel steering may include a means for determining a preferred angle of steering, wherein the preferred angle of steering reduces the amount of wheel skidding otherwise provided by the means for skid steering, and further wherein the means for determining a preferred angle of steering is based upon data derived from, or indicative of, the speed of at least one wheel. The means for skid steering may include means for driving both left wheels in the same direction at the same speed, and means for driving both right wheels in the same direction at the same speed, and means for driving the left and right wheels in the same direction and in different directions, and for driving the left and right wheels at the same speed and at different speeds, all while said left and right wheels are pointed straight ahead. The vehicle may be configured to make turns including both left turns and a right turns in the wheel steering mode and further wherein the means for wheel steering may include means for steering the wheels on the inside of the turns to a greater steering angle than the wheels on the outside of the turns. The difference in the steering angle of the inside wheels and the steering angle of the outside wheels may be determined by a digital microcontroller and may be based upon data indicative of the difference in speed between wheels on one side of the vehicle and wheels on the other side of the vehicle.

In accordance with a second aspect of the invention a skid steer vehicle is provided, including a chassis; two left wheels mounted in fore-and-aft relation to the left side of the chassis and operable to skid steer the vehicle when disposed in a straight ahead position; a left side hydraulic motor drivingly coupled to the two left wheels; two right wheels mounted in fore-and-aft relation to the right side of the chassis and operable together with said two left wheels to skid steer the vehicle when disposed in a straight ahead position; a right side hydraulic motor drivingly coupled to the two right wheels; a drive controller configured to drive and skid steer the vehicle in a skid steer mode of operation; and a steering controller configured to (1) receive signals indicative of left wheel speed, (2) receive signals indicative of right wheel speed, (3) calculate desired steering angles, and (4) steer the four wheels to those steering angles.

The skid steer vehicle may further include means for switching that is configured to engage and disengage the steering controller. The drive controller may be configured to skid steer the vehicle when the steering controller is disabled. The steering controller may be configured to automatically return the wheels to a straight-ahead position when the steering controller is disabled. The skid steer vehicle may yet further include a left operator input device coupled to the drive controller to drive the left wheels in forward, and in reverse, and a right operator input device coupled to the drive controller to drive the right wheels in forward and in reverse. The drive controller may have (1) a first mode of operation in which it is configured to drive the wheels on one side of the vehicle forward while simultaneously driving the wheels on the other side of the vehicle in reverse, (2) a second mode of operation in which it is configured to drive the wheels on one side of the vehicle forward while simultaneously driving the wheels on the other side of the vehicle in forward, and (3) a third mode of operation in which it is configured to drive the wheels on one side of the vehicle reverse while simultaneously driving the wheels on the other side of the vehicle in reverse. The steering controller may be configured to steer all four wheels in the first mode of operation, in the second mode of operation, and in the third mode of operation. The first second and third modes of operation may be selectable by at least one operator input device. The steering controller may receive and may be responsive to the signals indicative of left and right wheel speed, and further wherein the operator may select wheel speed by manipulating the first and second operator input devices. The signals may indicate (1) operator input device position, (2) pump displacement, (3) motor speed, (4) wheel speed.

In accordance with a third aspect of the invention, a steering system for a skid steer vehicle having at least two driven left wheels and two driven right wheels, each of the left wheels and the right wheels having a speed, the steering system is provided, the steering system including a left steering actuator configured to steer the two left wheels; a right steering actuator configured to steer at two right wheels; and a digital microprocessor-based controller coupled to the left steering actuator and the right steering actuator to steer the left wheels and the right wheels in accordance with left wheels' speed and right wheels' speed.

The controller may be configured to determine a steering angle of a left wheel based upon both a left wheel speed and a right wheel speed, and to determine a right wheel steering angle based upon both a left wheel speed and a right wheel speed. The left steering actuator may be configured to steer both left wheels the same amount and in opposite directions and the right steering actuator is configured to steer both right wheels the same amount in opposite directions. The steering controller may be configured to steer a left front wheel and a right front wheel in opposite directions when the left wheels and the right wheels rotate in opposite directions.

Numerous other features and advantages of the present invention will become readily apparent from the following detailed description, the accompanying drawings, and the appended claims.

DETAILED DESCRIPTION OF THE PREFERRED EMBODIMENTS

While the present invention is susceptible of being made in any of several different forms, the drawings show a particularly preferred form of the invention. One should understand, however, that this is just one of many ways the invention can be made. Nor should any particular feature of the illustrated embodiment be considered a part of the invention, unless that feature is explicitly mentioned in the claims. In the drawings, like reference numerals refer to like parts throughout the several views.

Figure 1:
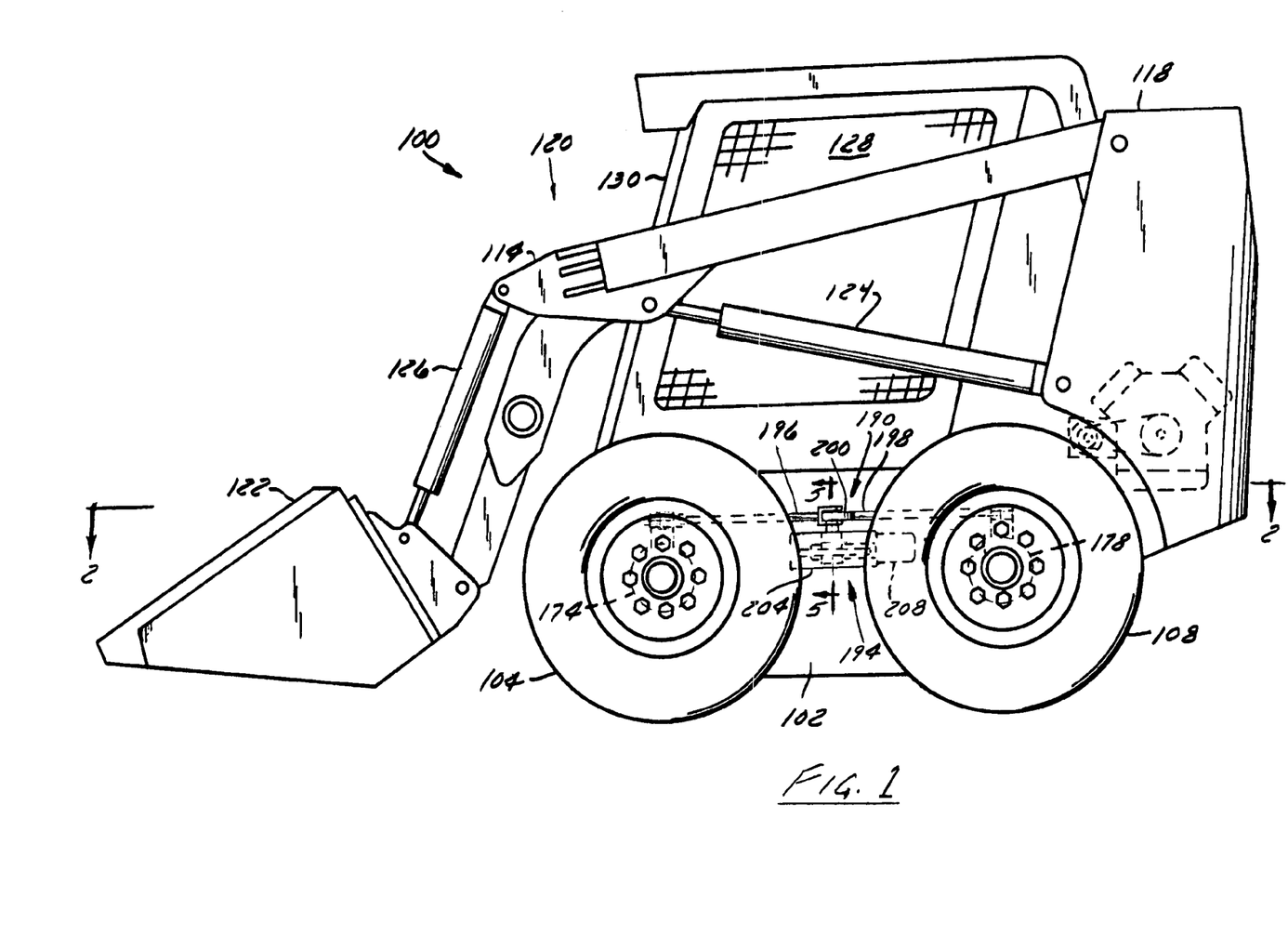
FIG. 1 is a left side view of a skid steer vehicle in accordance with the present invention.
Figure 2:
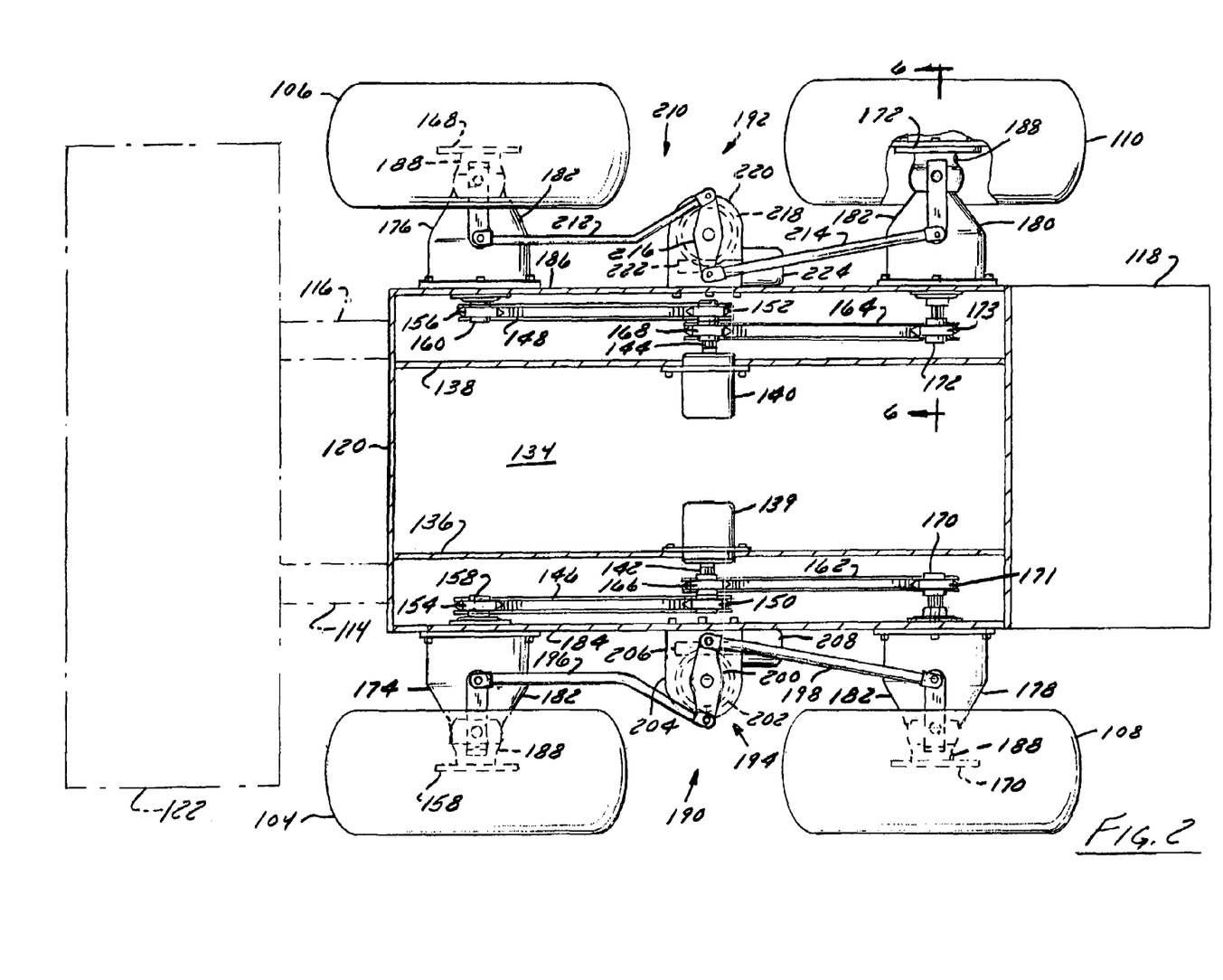
FIG. 2 is a cross-sectional plan view of the skid steer vehicle of FIG. 1 taken generally along section line 2-2, and showing the left and right side steering actuators.

Referring now to the FIGURES, there is illustrated a skid steer vehicle 100 having a chassis 102 that is supported by left front drive wheel 104, right front drive wheel 106, left rear drive wheel 108, an right rear drive wheel 110. Left side drive wheels 104, 108 support the left side of the vehicle entirely and right side drive wheels 106, 110 support the right side of the vehicle entirely.

A pair of loader arms 114,116 is pivotally coupled to the rear 118 of the chassis and extends forward beyond the front 120 of the chassis. A bucket 122 is pivotally coupled to the loader arms to carry a load. A pair of loader lift arm cylinders 124 (one shown) are coupled to and between the loader lift arms and the chassis to raise and lower the loader arms with respect to the chassis. A bucket cylinder 126 is coupled to and between the bucket and the loader lift arms to pivot the bucket with respect to the chassis.

An operator compartment 128 is disposed in a central portion of the chassis and is enclosed by a ROPS cage 130 that extends over the top of the operator's head.

In use, the operator sits in a seat in the operator compartment and manipulates two levers or a pair of joysticks. By manipulating these levers or joysticks, he causes the skid steer vehicle to go forward, backward, turn left, turn right, or rotate in place, as well as raise, lower, and tilt the bucket.

Chassis 102 defines a central cavity or compartment 134 in which the operator sits. It is bounded laterally by left and right inner sidewalls 136,138. Left and right side hydraulic drive motors 139,140 are mounted on these sidewalls and have drive shafts 142,144 extending therethrough.

Forwardly extending belts 146,148 are engaged to sprockets 150,152 on drive shafts 142,144 and extend forward to left and right side front axle sprockets 154,156 mounted on left and right side front axles 158,160.

Rearwardly extending belts 162,164 are engaged to sprockets 166,168 on drive shafts 142,144 and extend backward to left and right side rear sprocket 171,173 on rear axles 170,172.

Belts 146,148,162,164 may be of metallic, polymeric, or composite construction. They may be fiber reinforced. They may also be constructed of metal rollers.

Wheels 104,106,108,110 are mounted on the free ends of axles 158,160,170,172 to rotate whenever motors 139,140 rotate. This motor, belt and axle arrangement is configured to constrain the wheels on the left side of the vehicle to always rotate at the same ground speed and in the same direction. It is also configured to constrain the wheels on the right side of the vehicle to always rotate at the same ground speed and in the same direction. Although since the two drive motors are independently controllable, the wheels on each side of the vehicle may be driven in different directions (i.e. one driven forward and one driven in reverse) or the same direction, and may be driven at different speeds or the same speed.

Figure 6:
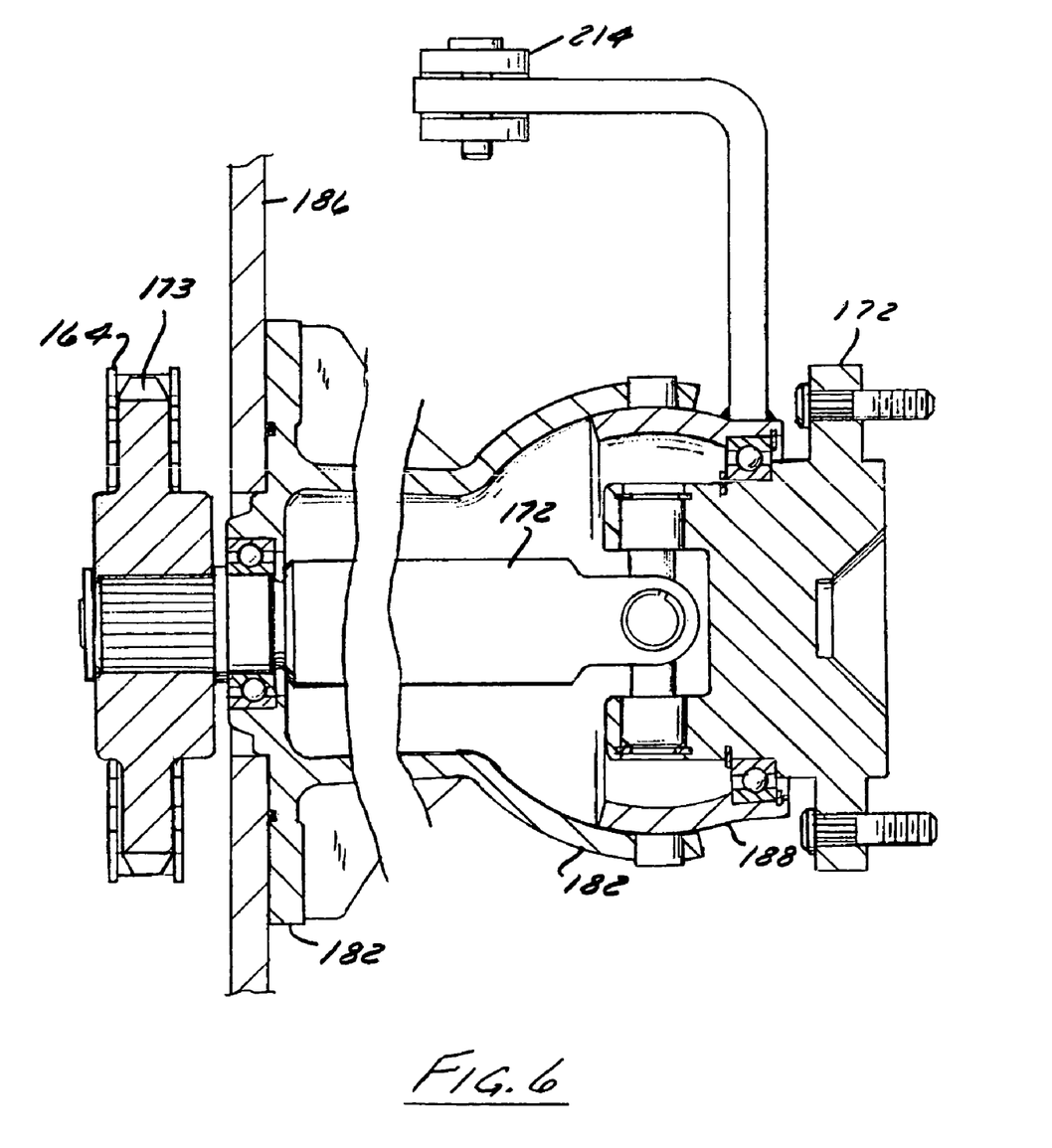
FIG. 6 is a rear cross-sectional view taken through right rear axle housing 180. It is taken generally along section line 6-6 in FIG. 2.

Axles 158,160,170,172 extend through and are supported by axle housings 174,176,178,180. FIG. 6 illustrates in detail the construction of the right rear axle housing 180. The construction of the three other axle housings is identical to the arrangement shown in FIG. 6.

Each axle housing 174,176,178,180 includes a conical inner portion 182 that is fixed to left or right outer sidewalls 184,186 of chassis 102. A swivel housing 188 of each axle housing 174,176,178,180 is pivotally coupled to the inner portion 182 to pivot with respect to the inner portion 182 about a generally vertical axis. It is this pivoting of the swivel housings that steers the vehicle's wheels with respect to the chassis. The swivel housing 188 of each axle housing 174,176,178,180 supports the free end of its respective axle 158,160,170,172, for pivoting about a generally vertical axis with respect to chassis 102. When the swivel housings pivot left and right, they in turn steer their associated wheels left and right respectively.

The swivel housings 188 of axle housings 174,176,178, 180 are steered by two steering systems, a left side steering system 190, and a right side steering system 192.

Figure 5:
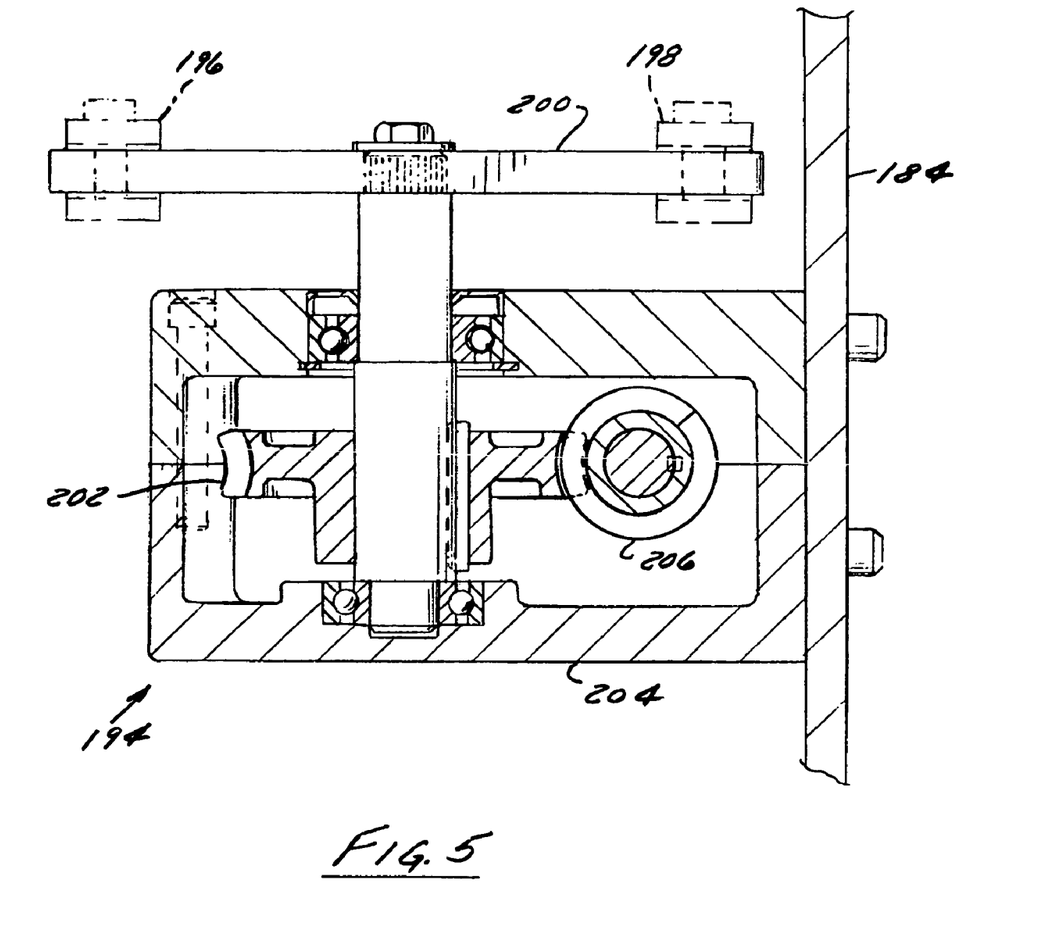
FIG. 5 is a rear cross-sectional view through the left side steering actuator taken generally along section line 5-5 in FIG. 1.

Left side steering system 190 includes a steering actuator 194 that is pivotally coupled to a forwardly extending steering arm or member 196 and a rearwardly extending steering arm or member 198. These steering arms are pivotally coupled to a bell crank 200 of the steering actuator. FIG. 5 illustrates steering actuator 194. Right side steering actuator 210 is identical in construction to actuator 194 but in mirror image form.

Bell crank 200 is coupled to a spur gear 202 that is disposed inside steering actuator housing or casing 204. Spur gear 202 is engaged with worm gear 206, which is also supported inside housing 204. A motor 208 is fixed to the outside of housing 204 and is coupled to worm gear 206 to drive it in rotation.

Whenever motor 208 rotates, it rotates worm gear 206, which in turn rotates bell crank 200. When bell crank 200 rotates clockwise, it pushes steering arms 196, 198. This movement causes the left front swivel housing, wheel 104 to rotate anti-clockwise (as viewed from above), and causes the left rear swivel housing and wheel 108 to rotate clockwise (as viewed from above). When bell crank 200 rotates anti-clockwise, it pulls steering arms 196, 198. This movement causes the left front swivel housing and wheel 104 to rotate clockwise (as viewed from above) and causes the left rear swivel housing and wheel 108 to rotate anti-clockwise (as viewed from above).

The wheels on the left side of the vehicle are therefore mechanically constrained to always be steered in opposite directions. Whenever the left front wheel turns right, the left rear wheel turns left. Whenever the left front wheel turns left, the left rear wheel turns right. Furthermore, the steering arms and the steering actuator of the left side steering system are configured to point the wheels straight ahead whenever the left side wheels are steered to have parallel rotational axes, as best shown in FIG. 2.

Right side steering system 192 is identically constructed to steering actuator 194, but in mirror arrangement. It includes a steering actuator 210 that is pivotally coupled to a forwardly extending steering arm or member 212 and a rearwardly extending steering arm or member 214. These steering arms are pivotally coupled to a bell crank 216 of the steering actuator.

Bell crank 216 is coupled to a spur gear 218 that is disposed inside steering actuator housing or casing 220. Spur gear 218 is engaged with worm gear 222, which is also supported inside housing 220. A motor 224 is fixed to the outside of housing 220 and is coupled to worm gear 222 to drive it in rotation.

Whenever motor 224 rotates, it rotates worm gear 222, which in turn rotates spur gear 218 and bell crank 216 affixed to the spur gear. When bell crank 216 rotates anti-clockwise, it pushes steering arms 212,214. This movement causes the right front swivel housing and wheel 106 to rotate clockwise (as viewed from above) and causes the right rear swivel housing and wheel 110 to rotate anti-clockwise (as viewed from above). When bell crank 216 rotates clockwise, it pulls steering arms 212,214 toward it. This movement causes the right front swivel housing and wheel 106 to rotate anti-clockwise (as viewed from above) and also causes the right rear swivel housing and wheel 110 to rotate clockwise (as viewed from above).

The wheels on the right side of the vehicle are therefore mechanically constrained to always be steered in opposite directions. Whenever the right front wheel turns right, the right rear wheel turns left. Whenever the right front wheel turns left, the right rear wheel turns right. Furthermore, the steering arms and the steering actuator of the right side steering system are selected to point the right side wheels 106,110 straight ahead whenever the right side wheels are steered to have parallel rotational axes, as best shown in FIG. 2.

Furthermore, whenever the left side steering system 190 is steered to place left side wheels 104, 108 into parallel axial relationship and when the right side steering system 192 is steered to place the right side wheels 106,110 into parallel axial relationship, then all four rotational axes of all four wheels are horizontal, parallel to each other and perpendicular to the longitudinal axis of vehicle 100.

Steering motors 208 and 224 are preferably electric or hydraulic motors. If electric motors, they are preferably stepping motors configured to be stepped to any of a variety of rotational positions and stopped. They may have built-in position sensors that sense their absolute rotational position. Alternatively, they may have relative rotation sensors built in that indicate the relative motion of the motor when they rotate between several different positions.

Motors 208 and 224 can be independently driven to steer the wheels on each side of the vehicle to different steering positions. There are several preferred combinations or left side and right side steering positions to which motors 208,224 can steer their respective left and right side wheels.

First, motors 208,224 are configured to steer all four wheels to a position in which the rotational axes of all four wheels are horizontal, parallel to each other and the wheels point straight ahead. This is called the straight-ahead position and is best shown in FIGS. 1 and 2.

Figure 3:
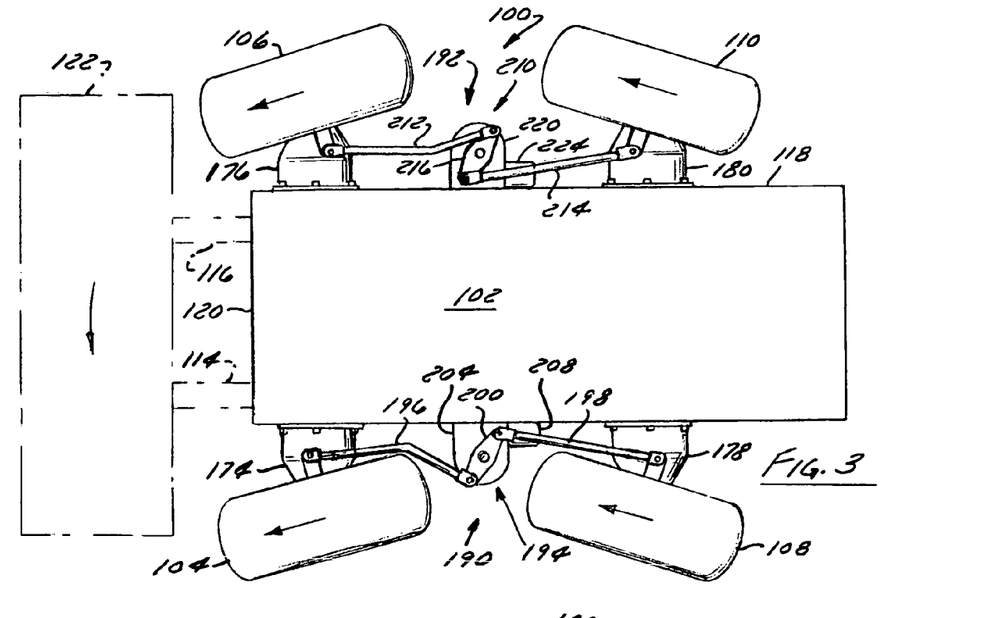
FIG. 3 is a plan view of the skid steer of FIGS. 1-2, in which the wheels are turned to steer to the left with limited skidding.

Second, motors 208,224 are configured to steer all four wheels to a position in which (1) the rotational axes of the left and right front wheels are generally parallel, with the front wheels pointing to the left at a first angle, and (2) the rotation axes of the left and right rear wheels are generally parallel with the rear wheels pointing to the right at a second angle generally equal to the first angle, This is called a left turn steer position and is best shown in FIG. 3.

Third, motors 208,224 are configured to steer all four wheels to a position in which (1) the rotational axes of the left and right front wheels are generally parallel, with the front wheels pointing to the right at a third angle, and (2) the rotation axes of the left and right rear wheels are generally parallel with the rear wheels pointing to the left at a fourth angle generally equal to the third angle, This is a called a right turn steer position and is a mirror image of the configuration shown in FIG. 3. It has not been separately illustrated herein.

Figure 4:
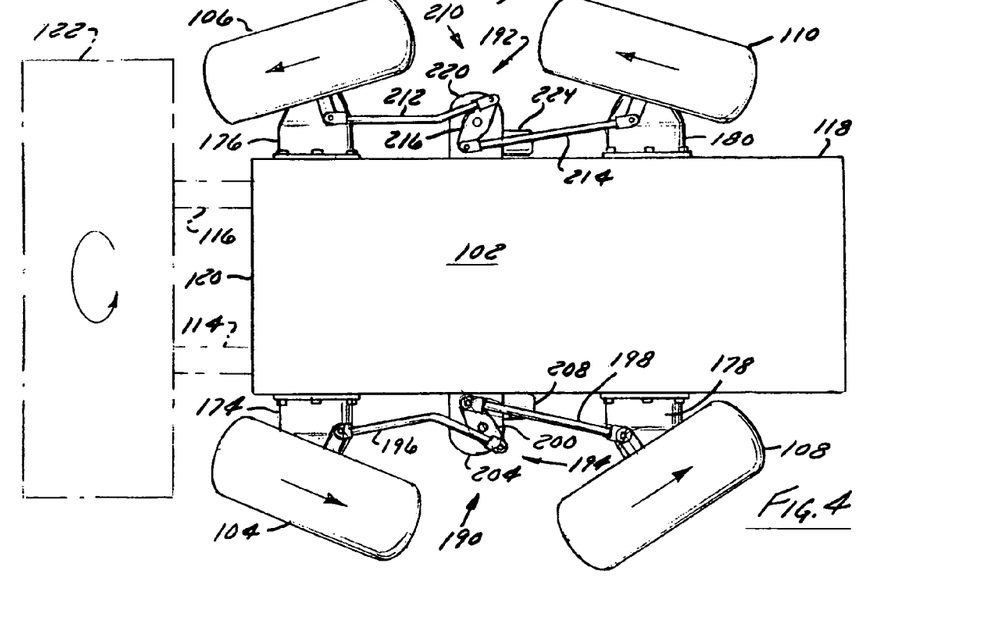
FIG. 4 is a plan view of the skid steer of FIGS. 1-4 in which the wheels are turned to a pivot steer position.

Fourth, motors 208,224 are configured to steer all four wheels to a position in which (1) the left front and the right front wheels are turned inward, with the left front wheel turned right and the right front wheel turned left, and (2) the left and right rear wheels are turned outward, with the left rear wheel turned left and the right rear wheel turned right. This is called a pivot steer position and is shown in FIG. 4.

In a particularly preferred pivot steer position, the left front wheel and the right rear wheel preferably have parallel axes of rotation and point to the right at a fifth angle with respect to the longitudinal axis of the vehicle 100, and the right front wheel and the left rear wheels have parallel axes of rotation and are pointed to the left at a sixth angle that is generally equal to the fifth angle. This position is shown in FIG. 4.

Figure 7:
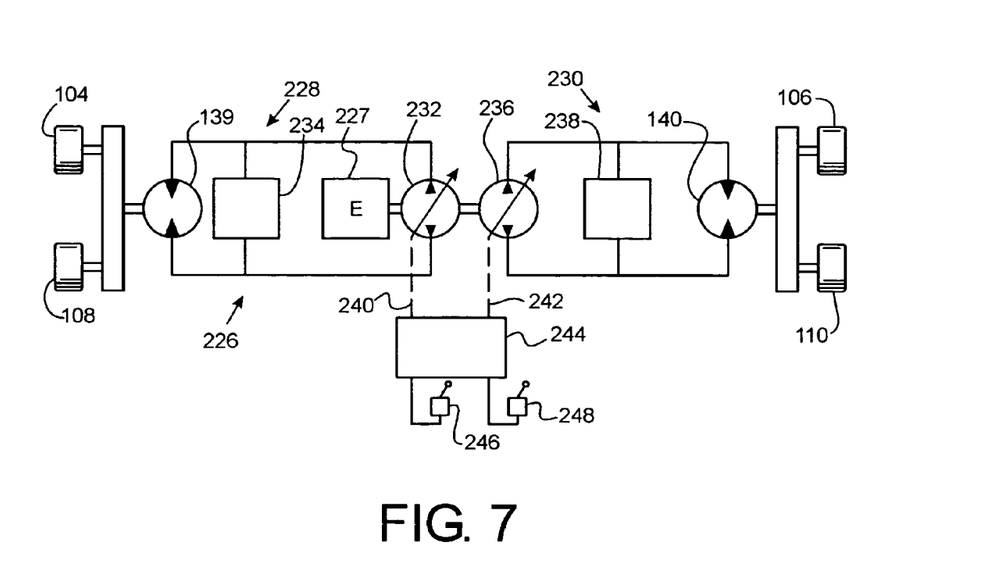
FIG. 7 is a schematic view of the hydraulic motor drive circuit of the vehicle of FIGS. 1-6, showing the hydraulic circuits and the digital controller that controls them.

FIG. 7 illustrates a drive control system 226 for the vehicle. It includes a left side hydraulic circuit 228, which in turn is coupled to and drives the left side motor 139. Control system 226 also includes a right side hydraulic circuit 230 that drives the right side motor 140.

Left side hydraulic circuit 228 and right side hydraulic circuit 230 are arranged identically.

Left side circuit 228 has a hydraulic pump 232 that is coupled to left side hydraulic motor 139. Left side hydraulic circuit 228 also includes a conventional anti-cavitation and pressure relief circuit 234 that prevents overpressure and cavitation.

Right side circuit 230 has a hydraulic pump 236 that is coupled to and drives right side hydraulic motor 140. Right side circuit 230 also includes a conventional anti-cavitation and pressure relief circuit 238 that prevents overpressure and cavitation.

Pumps 232,236 are preferably variable displacement bidirectional pumps that are coupled to and driven by skid steer engine 227. Pumps 232 and 236 are responsive to mechanical, electrical, or hydraulic signals as described below to change their displacement, depending upon the desired configuration of the drive control system. Their direction of flow can be reversed as well. The ability to vary output and to reverse flow permits pumps 232, 236 to send hydraulic fluid in both directions through the hydraulic circuits 228, 230, and therefore to send hydraulic fluid in both directions through motors 139,140. The motors can therefore be controlled to rotate at any desired speed up to the maximum output of the pumps.

Signals on signal lines 240,242 change the displacement of the pumps. Signal lines 240,242 are coupled to and the between controller 244 and pumps 232,236.

Electronic controller 244 is coupled to two operator input devices 246,248 that generate signals indicative of a desired direction and speed of travel when manipulated by the operator. In one arrangement, operator input devices 246, 248 include a lever or joystick that has a potentiometer or shaft encoder coupled thereto. The lever of device 246 is on the left side of the vehicle. When the operator pushes the lever forward, device 246 generates a signal proportional to the distance pushed forward and indicates a forward direction of travel for the motor and wheels on the left side of the vehicle. When the operator pulls back on the lever it similarly generates a signal proportional to the distance it is pulled back and indicates a reverse direction of travel.

The lever of device 248 is identically arranged on the right side of the vehicle to generate a signal proportional to movement and to indicate forward and backward directions in the same manner as device 246, but for the right side motor and wheels.

When the levers are pushed forward, the pump displacements are changed proportional to the distance the levers are moved and the directions of fluid flow through the pumps are provided according to the directions of the lever movement.

When the flow passes through the motors, the wheels responsively rotate proportional to the displacement of the levers and in the directions indicated by the levers.

Thus the operator separately indicates the speed of rotation of the wheels on the left and right side and also the direction (forward or backward) of rotation of the wheels on the left and right side, by moving the left and right levers of devices 246, 248 in the desired direction the desired amount.

In an alternative embodiment, the two levers of devices 246, 248 can be replaced with a single lever or joystick. This single lever or joystick is configured to generate two output signals, one signal indicating the left side wheels' speed and direction, and the other signal indicating the right side wheels' speed and direction.

In this alternative embodiment the joystick or lever is preferably a joystick that can be manipulated in two orthogonal directions: left-to-right, and front-to-rear and to generate two signals, one signal indicating the degree of left to right movement and the other signal indicating the degree of fore-and-aft movement. Controller 244 is configured to decode these two signals and convert them into two separate drive signals: one for the wheels on the left side of the vehicle and one for the wheels on the right side of the vehicle. Controller 244 is configured to decode the signals in the following manner.

The operator pushes this joystick straight ahead to go straight forward. Controller 244 responsively drives all four wheels forward at the same speed. The speed is proportional to how far forward the driver pushes the joystick. To go straight backwards, the operator pulls the joystick straight backwards. Controller 244 responsively drives all four wheels backward at the same speed. Speed is proportional to how far back the joystick is pulled.

To rotate the wheels on one side of the vehicle at a speed different that the speed of the wheels on the other side of the vehicle, the operator pushes the joystick (for forward travel) or pulls the joystick (for backward travel), while also pulling the joystick to the left or right. The farther the operator pulls the joystick to the left or right as he pulls or pushes on the joystick, the greater the difference in speed between the wheels on the left side and the wheels on the right side, and the faster the vehicle turns to left or to the right.

To provide this control of all four wheels using a single operator input device, either of device 246 or device 248 is configured as a two axis input device and more preferably as a two axis joystick. In this manner, one device (either device 246 or device 248) can be used to provide completely independent rotational speed and rotational direction control both for the wheels on the left side and for the wheels on the right side of the vehicle.

The other device in this configuration can be used to manipulate the loader arms and the bucket. Complete control over vehicle motion is therefore provided in this embodiment by a single joystick on one side of the vehicle and the remaining implement operations provided by the other joystick on the other side of the vehicle.

Figure 8:
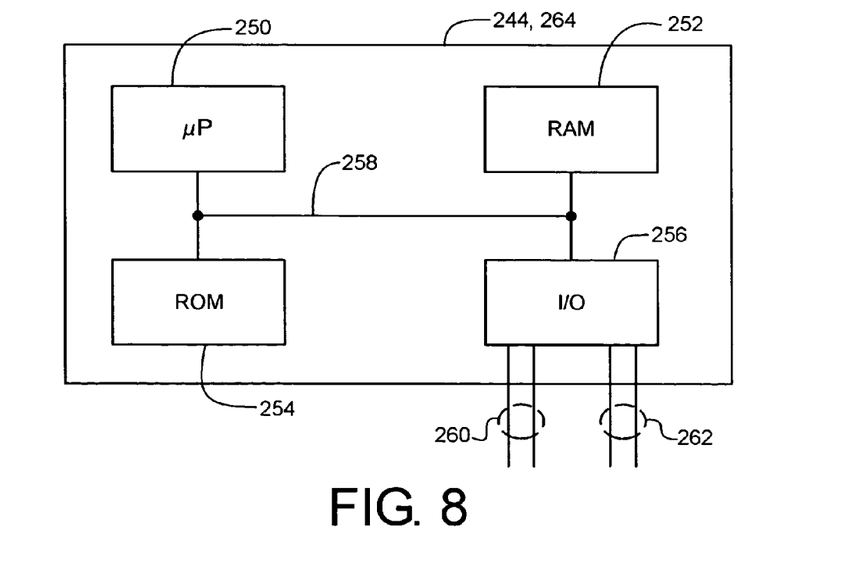
FIG. 8 is a detailed schematic diagram of the digital controller of FIG. 7 and the digital controller of FIG. 9.

FIG. 8 illustrates a preferred configuration for controller 244 of the present application. Controller 244 includes a digital microprocessor or microcontroller 250 that is coupled to a random access memory (RAM) 252, a read-only memory (ROM) 254 and an input and output (I/O) circuit 256. These devices are coupled together by data/address/control bus 258.

Controller 244 is connected to the outside world by signal lines 260 and 262. Input signal lines 260 include the signal lines coupled to and between I/O circuit 256 and input devices 246,248, and output signal lines 262 include signal lines 240, 242 that are coupled to and between I/O circuit 256 and pumps 232,236 to control the displacement of pumps 232, 236.

When the operator moves the input devices the signals generated by the input devices change. This change in the input device signals is transmitted from I/O circuit 256 to microprocessor 250. Microprocessor 250 receives the signals, decodes them, and converts them into the appropriate pump command signals in accordance with a digital program stored in ROM memory 254. Microprocessor 250 then commands I/O circuit 256 to signal the pumps to change their displacement. I/O circuit 256 responsively transmits the pump command signals on signal lines 260 to indicate the new pump displacements. Pumps 232,236 responsively change their displacement to match the commanded displacement and direction of flow. Motors 139,140, in turn, change their speed and direction of rotation in accordance with the new pump displacements.

The particular computer program stored in ROM memory 254 will vary depending upon the particular type of pump, the particular microprocessor, and the particular input devices employed. Nonetheless, all such programming is well within the capabilities of one skilled in the art. For these reasons, we do not provide a detailed description of the programming.

Referring back to FIG. 7, Motors 139, 140 preferably have a fixed displacement. They rotate proportional to the direction of fluid flow and the volume of fluid flow from pumps 232, 236. When the fluid flow rate from the pumps changes, the speed of the motors (and hence the wheels) changes proportionately. The wheels on each side of the vehicle have their own motor. Each motor is driven by its own pump. Each pump is predominately controlled by its own operator input device. Using the input devices, the operator can therefore select the wheels on one side of the vehicle and command them independently of the wheels on the other side of the vehicle. Using the input devices, the operator can also select the direction of rotation of the wheels on each side of the vehicle independently of the wheels on the other side of the vehicle. In the embodiment shown in FIG. 7, the wheels on each side of the vehicle rotate at the same angular velocity and rotate at the same effective ground speed.

In an alternative embodiment, the motors may have two or three alternatively selectable fixed displacements. By selecting different motor displacements, the operator can operate the vehicle in different speed ranges. In yet another alternative embodiment, the motors are variable displacement motors.

Figure 9:
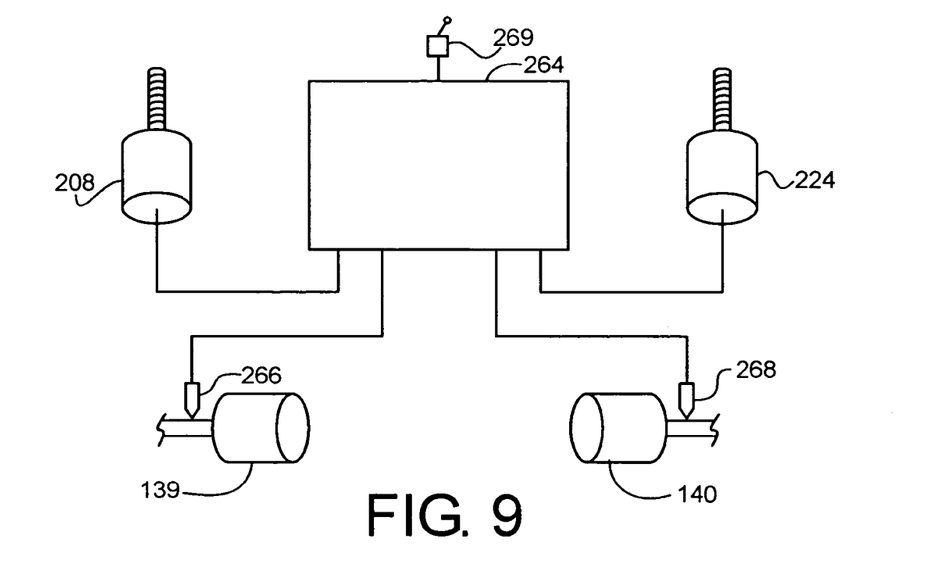
FIG. 9 is a schematic diagram of the steering control system of the vehicle of FIGS. 1-8.

FIG. 9 illustrates the vehicle's steering system. The system includes controller 264, speed sensors 266,268, steering motors 208,224, and switch 269. Controller 264 is coupled to the speed sensors. The speed sensors are coupled to the drive system of the vehicle, preferably coupled to the motors as shown here, although they may be coupled elsewhere.

The speed sensors generate speed signals indicative of the speed of wheel rotation. In the preferred embodiment, these speed signals are also proportional to and indicative of (1) the speed of wheel rotation, (2) the speed of travel of the vehicle over the ground, (3) the fluid flow rate through the pumps, (4) the fluid flow rate through the motors, (5) the specific displacement of the pumps, and (6) the pump signals applied to the pumps to change their displacement. In the embodiment illustrated herein, with its fixed displacement motors, variable displacement pumps, and hydrostatic drive, these parameters are all proportional to and indicative of the speed of wheel rotation.

Controller 264 is a controller constructed identically to controller 244 shown in FIG. 8. Instead of being connected to input devices or pumps, however, controller 264 is connected to the speed sensors 266, 268 and the steering motors 208, 224. The sensors and switch are coupled to input signal lines 260 of I/O circuit 256 of controller 264, and steering motors are coupled to output signal lines 262 of I/O circuit 256.

Controller 264 receives signals from speed sensors 266, 268 that are indicative of the speed of rotation of the wheels. Controller 264 calculates a preferred wheel steering position, and turns the wheels to that position. Controller 264 is also configured to monitor the position of switch 269 and to enable or disable wheel steering (i.e. turning the wheels left or right by way of motors 208, 224) accordingly. When controller 264 senses that switch 269 is in a first position, controller 264 enables wheel steering. In this position, controller 264 performs the speed monitoring and four-wheel steering operations described above. When switch 269 is in a second position, controller 264 disables wheel steering, steers all four wheels to a straight ahead position and holds them in that position, regardless of the input from the speed sensors 266, 268.

The speed sensors are preferably Hall-effect devices. They are preferably coupled to the motors or are formed integral with the motors to provide a signal indicative of the motor speed. The wheel speed is proportionate to the motor speed, and thus the speed sensors provide a signal indicative of (and proportional to) the speed of the wheels.

Figure 10:
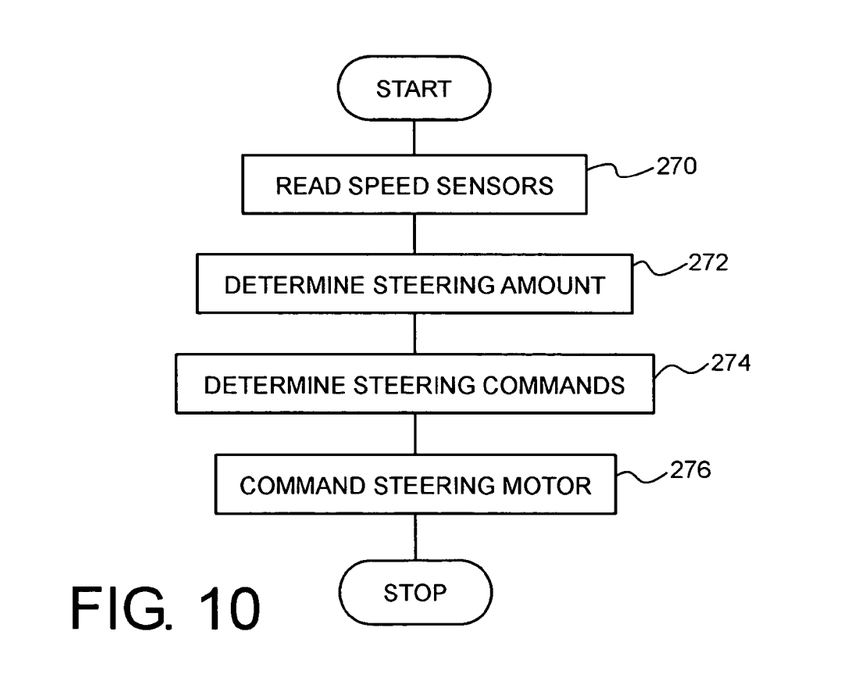
FIG. 10 is a flow chart illustrating the operation of the controller of FIG. 9.

FIG. 10 illustrates the process performed by the steering system. In the steps shown in FIG. 10, controller 264 reads the speed sensors, determines the appropriate degree of wheel steering for the wheels on both sides of the vehicle, and drives the steering motors 208, 224 to turn the wheels the appropriate amount.

The speed of the motors and wheels on each side of the vehicle is determined by controller 244. As explained above, the operator commands particular wheel speeds by manipulating the left and right-side operator input devices 246,248, or in the alternative single input device embodiment, by manipulating one of input devices 246, 248 fore-and-aft as well as left to right.

At the start of the process (step 270), controller 264 reads the speed sensors and determines the speed of the wheels. Controller 264 then determines the appropriate amount of steering for the wheels in accordance with the wheel speeds in step 272. Controller 264 then determines the appropriate steering commands to provide the proper wheel steering angles in step 274. Controller 264 then commands the steering motors to turn the wheels to the appropriate angle in step 276.

The steps shown in FIG. 10 are preferably executed continuously and repeatedly while the vehicle is operated and switch 269 is in its first position. Controller 264 is configured to repeatedly execute steps 270-276 at least once every 10 to 200 milliseconds. At this rate, controller 264 is able to respond quickly to the changing wheel speeds as the operator rapidly moves the operator input devices 246,248 changing the speeds of the wheels.

Figure 11:
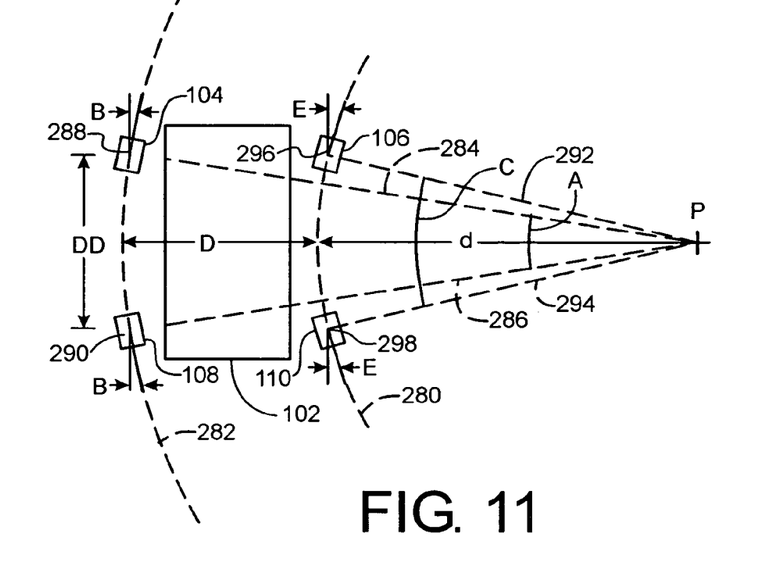
FIG. 11 is a graphical illustration showing the vehicle of the foregoing figures and illustrating the geometry of the steering system as the vehicle makes a wide right turn with the left side wheels turning faster than the right side wheels, the vehicle traveling forward and all four wheels rotating in a forward direction
Figure 12:
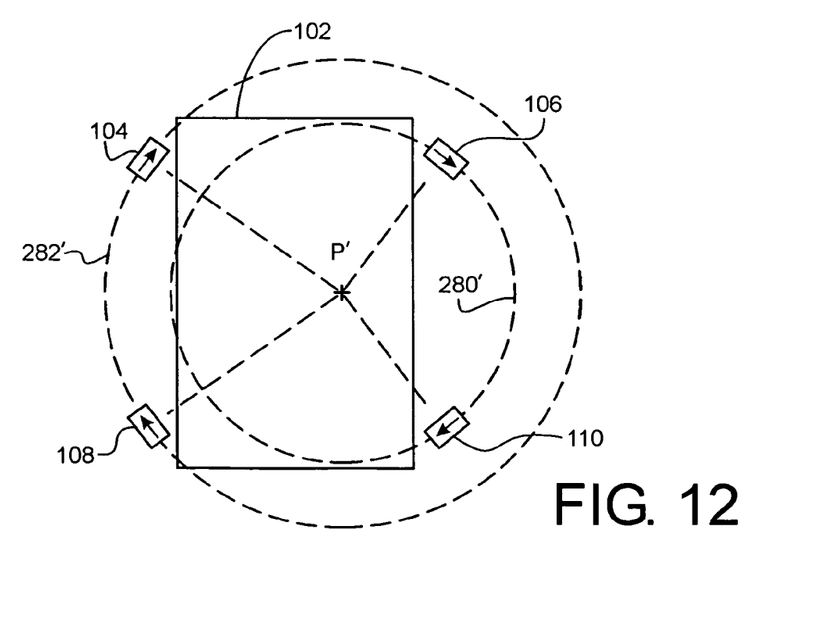
FIG. 12 is a graphical illustration showing the vehicle of the foregoing figures and illustrating the geometry of the steering system as the vehicle makes a circle turn or turn-in-place with the left side wheels turning faster than the right side wheels, the vehicle traveling forward, the left side wheels rotating in a forward direction and the right side wheels rotating in a reverse direction.

To explain the process of determining the appropriate steering angle in more detail, we provide FIGS. 11-12. FIG. 11 illustrates the chassis of the skid steer vehicle at one specific instant in time as it is driven forward and is being turned slightly to the right. FIG. 12 illustrates the chassis of the skid steer vehicle at one specific instant in time as it is being rotated in place in a clockwise direction.

The illustration in FIG. 11 captures the status of the vehicle at an instant. At the split second this "snapshot" of the vehicle is taken, the left wheels' (104, 108) instantaneous speed is Va and the right wheels' (106, 110) instantaneous speed is Vb. The wheels are not shown pointing straight ahead as they would be in a traditional skid steer vehicle, but are shown steered to angles that reduce (and preferably minimize or eliminate) skidding.

Controller 264 receives speeds Va and Vb from speed sensors 266, 268. Based on Va and Vb, controller 264 then calculates what the instantaneous turning radius of the wheels should be to turn the vehicle without any skidding (or with reduced or minimized skidding). Controller 264 then determines what the steering position of the wheels would be for a turn of this radius and commands the steering motors to turn all four wheels to those steering positions. The above is a summary of the entire steering process of FIG. 10.

One advantage of this process is that the steering is modular—it is configured as a skid-reducing adjunct or supplement to the regular skid steering performed by the vehicle. Controller 244 is configured to steer or turn the vehicle by rotating the wheels on each side of the vehicle at different speeds. Controller 244 has the capacity to turn the vehicle to the left or to the right all by itself by skid steering. From this perspective, controller 264 of the steering system is not necessary to turn the vehicle to the left or the right. It merely reduces wheel skidding and wear by steering the wheels. Controller 264 does this by monitoring the speeds of the wheels and adaptively steering the wheels to a low skidding (preferably no skidding) position. If the functionality provided by controller 264 was eliminated, the operator would still be able to drive the vehicle in a traditional manner. In this sense, controller 264 is modular. It can be added on top of the traditional steering system as an additional feature to reduce the skidding of the wheels, but is not necessary to steer the vehicle.

It should be understood that controller 264 performs these skid-reducing calculations virtually instantly. Every time the operator changes wheel speed by manipulating operator input devices 246, 248, the steering controller 264 senses this change in speed and changes the steering angle of the wheels to minimize skidding at the new wheel speeds.

As shown in FIG. 11, the left wheels are turning forward at a velocity Va and the right wheels are turning at a velocity Vb that is slower than Va. Whenever wheels on any skid steer vehicle are driven at different speeds like this, the vehicle will turn toward the right. Similarly, when the right wheels turn faster than the left wheels, the vehicle will turn toward the left. The reason we have not separately illustrated a left turn herein is that a left turn is a mirror image of the right turn.

Referring back now to FIG. 11, the vehicle will turn (skid steer) to the right based upon the difference in left (Va) and right (Vb) wheel speeds. Assuming the wheels keep turning at different speeds Va and Vb indefinitely, the right wheels will describe one circular path 280, and the left wheels will describe a second, larger circular path 282 that is concentric with path 280.

The right wheel circular path 280 has a center point P and a radius d. This circle of radius d describes the instantaneous path of the vehicle—the path the vehicle "wants" to follow at that specific instant, given the instantaneous and different speeds Va and Vb. Of course, as soon as the operator moves the operator input devices, the speeds Va and Vb will change, the instantaneous radius d will change and the instantaneous paths of travel will change as well.

The left wheel circular path 282 has the same center point P and an instantaneous turning radius D+d, where D is the additional radial distance between path 280 and 282. D is approximately equal to the distance between the left and right wheels.

Paths 280 and 282 have both different radii and different lengths (i.e. circumferences). If the wheel's travel at constant speeds Va and Vb, the skid steer vehicle will turn in a big circle about center point P, and return to its beginning point. The left wheels will have traveled a distance of almost 2*pi*r or 2*pi*(D+d) and the right wheels will have traveled a distance of 2*pi*r or 2*pi*d.

Controller 264 is configured to calculate the difference in turning radius of the outer wheels and the inner wheels and the proper steering angles of all the wheels in the following manner.

We know from basic geometry that the ratio of distances traveled as the wheels traverse their circular paths is equal to the ratio of the wheel speeds. Thus:

$$(2*pi*d/(2*pi*(D+d)))=Va/Vb \qquad \text{Eqn. 1}$$

Solving for d, the distance to the center of the circle from the inside (e.g. right rear) wheel, we get:

$$d=D*Vb/(|Va-Vb|) \qquad \text{Eqn. 2}$$

What Equation 2 indicates is that whenever the speed, Va, of the left wheels is known, and the speed, Vb, of the right wheels is known, and the side-to-side distance, D, between the left and right wheels is known, one can determine the distance, to the center of the turning circle. That distance is about D+d for the left (i.e. outside) wheels and d for the right (i.e. inside) wheels Controller 264 is configured to read the wheel speeds in step 270 and to calculate this distance in step 272 of FIG. 10.

To minimize skidding, all the wheels should be turned such that they are tangential to the circular paths on which they travel as the vehicle is skid steered. In other words, they should be turned such that their rotational axes are parallel to the instantaneous turning radius (D or d) of the wheels. All four wheels are shown in this skid-minimizing position in FIG. 11 in which their axes of rotation are parallel to the radius of curvature of their paths, or stated differently, in which the wheels are tangent to their instantaneous paths of travel.

Plane geometry tells us that the outer (i.e. left) wheels are tangent and therefore skidding is minimized if they are turned to an angle B. Angle B is equal to one-half of the angle A. Angle A is the angle between lines 284 and 286. Lines 284 and 286 are the instantaneous turning radii of the left front and the left rear wheels. The lines pass though the center point P and the points of contact 288,290 of the left wheels with the ground.

Angle A can be calculated using our knowledge of d (which we can determine from the wheels' speeds), and D (the side-to-side wheel spacing), and DD (the front-to-rear wheel spacing). Once angle A is calculated, it is divided by 2 and the result is the steering angle B that minimizes skidding. Controller 264 is configured to make these calculations.

The steering angle E for the right side (inner) wheels may be similarly calculated similarly using angle C between radius lines 292 and 294, which extend from points of contact 296,298 of the inner wheels with the ground.

In step 272 of FIG. 10, controller 264 is configured to calculate the steering angles B and E in this manner. The wheels are shown in FIG. 11 steered to steering angles B and E.

It should be clear from the FIGURES and the description herein that for each desired steering angle B there is a corresponding rotational position for the left side steering motor. Similarly, for each desired steering angle E there is a corresponding rotational position for the right side steering motor. The particular numeric relationships between the motor rotational positions and the steering angles will depend upon the geometry of the steering actuators, the geometry of the steering motors, and the geometry of the various steering linkages. For this reason, it will not be discussed herein. Controller 264 is programmed with these numeric relationships, preferably in either equation form or table form.

In step 274 of FIG. 10, once controller 264 has calculated the desired steering angles B and E, controller 264 is configured to use these steering angles together with the numerical relationships to calculate (or look up) the desired rotational position of the two steering motors.

In step 276, controller 264 is configured to drive the left and right steering motors until the motors reach their desired rotational positions and the wheels reach steering angles B and E.

It should be understood from the above explanation that controller 264 is configured to steer the left side and the right side wheels to different steering angles. Controller 264 is configured to steer the left and right wheels to steering angles that minimize skidding. Controller 264 is also configured to steer the left and right wheels to steering angles that have a common center point of rotation. Controller 264 is configured to simultaneously steer the wheels on one side of the vehicle to one angle using one actuator, and to simultaneously steer the wheels on the other side of the vehicle to a second angle different from the first angle with another actuator. Controller 264 is configured to steer the front wheels in one direction (either right, as shown in FIG. 11, or left) and to simultaneously steer the rear wheels in the opposite direction (either left, as shown in FIG. 11, or right).

Controller 264 is configured to calculate a steering angle B and a steering angle E that is different from angle B. This is the preferred embodiment, since different steering angles for each side of the vehicle permit the wheel's to better track the two different turning circles with different turning radii, and this reduces skidding, It is not absolutely necessary that the steering angles for opposite sides of the vehicle be different, however.

In an alternative steering arrangement, all four wheels may be coupled to a single steering actuator such that the front wheels turn to the same front turning angle and the rear wheels turn to the same rear turning angle. One way this arrangement may be provided in the vehicle shown herein is by removing the right side steering actuator and steering arms of the illustrated vehicle, coupling a first new steering arm between the left front and the right front wheels such that they always steer together at the same angle, and coupling a second new steering arm between the left and right rear wheels so they always steer together at the same angle. With all four wheels coupled together, a single steering actuator could steer all four wheels simultaneously—with the front wheels turning in one direction and the rear wheels turning in another direction.

In a configuration such as this, controller 264 would be configured to calculate a single compromise steering angle for all four wheels that would reduce skidding. In the example shown in FIG. 11, this compromise steering angle for all four wheels would preferably be angle B, angle E or some other angle close to (and preferably midway between) angles B and E. Controller 264 would calculate it in the same manner as controller 264 calculates steering angles B and E above.

In another alternative skid steer vehicle, the front (alternatively, the rear) wheels may be configured to steer while the rear (alternatively, the front) wheels remain fixed. This could be provided by removing the rear (alternatively the front) steering linkages and fixing the rear (alternatively, the front) wheels in a non-steerable position. As in the present case, the steerable wheels could either be steered by controller 264 thereby minimizing skidding or the steering system of FIG. 9 could be disengaged (using switch 269) and just the vehicle skid steered by controller 244.

FIG. 12 shows a second steering configuration in which the operator has commanded the wheels on one side of the chassis 102 to rotate forward and the wheels on the other side of the chassis to rotate backward. This turning-in-place capability perfectly illustrates the extreme capabilities of a skid steer vehicle. In this configuration, the vehicle rotates about a center point of turning P' that is situated between the four wheels—a center of turning that is located within the wheelbase defined by the four wheels of the vehicle.

As in the example of FIG. 11, controller 264 reads the speeds of the left and right wheels from speed sensors 266, 268. In this case, however, controller 264 is also configured to determine from the sensor signals that the wheels are rotating in opposite directions: left wheels forward and right wheels backward. For this reason, it is beneficial to use speed sensors that provide not only speed information but rotational direction information as well.

Since the wheels are rotating in opposite directions, the wheels on the left side of the vehicle are following a circular path 282' and are positioned on the left side of the circular paths. The wheels on the right side of the vehicle are following a circular path 280' and are positioned on the right side of the circular paths. Both circular paths 280', 282' share a common center point of rotation P' that is disposed between the left and the right wheels.

Controller 264 determines that the left and right wheels are on opposing sides of their respective circular paths based upon the fact that the wheels are turning in opposite directions. Whenever controller 264 determines that the wheels are turning in opposite directions on opposing sides of the vehicle, and therefore determines that the vehicle is turning in place, controller 264 performs the calculations described in conjunction with FIG. 11 slightly differently.

In the example of FIG. 12, the left side wheels 104,108 are rotating in a forward direction at a speed slightly greater than the right side wheels 106,110 are rotating in a backward direction. As a result, the left side wheels are following a circular path 282' of slightly greater radius than the circular path 280' that is followed by the right side wheels. Since the speeds are slightly different, the paths have slightly different radii, as shown in FIG. 12, and the center P' of the circular paths is slightly offset to one side of the vehicle.

In precisely the same manner as it does in the illustrative example of FIG. 11, controller 264 is configured to calculate the steering angles of each of the wheels in FIG. 12 that will minimize skidding and make the wheels align as closely as possible to the instantaneous circular paths of travel 280', 282' defined by the wheel speeds to make the wheels tangent to their circular paths just as they are in FIG. 11. Controller 264 is therefore able to automatically steer the wheels such that the two front wheels turn inward (FIG. 12) and the two rear wheels turn outward (FIG. 12) at the same time. Controller 264 is further configured to turn the left front wheel inward at an angle that is different from the angle at which the right front wheel is turned inward, and to turn the left rear wheel outward at an angle that is different from the angle at which the right rear wheel is turned outward.

Controller 264 will not always be able to turn the wheels to a position that completely eliminate skidding. There are practical limits to how far each of the wheels can be turned with respect to the chassis of the vehicle. As a result, the wheels may not be steerable to a position that will eliminate skidding. For this reason, controller 264 is configured to steer the wheels as far as possible to eliminate skidding, but is also configured to stop driving the steering motors 208, 224 and to stop trying to steer the wheels when the wheels are steered so far that they reach their practical limit of steering. This limit will, of course, vary from vehicle to vehicle. Thus, controller 264 will try as hard as possible to limit all wheel skidding, but will transition seamlessly into a skidding when it reaches the wheels' steering limit mode in a manner unnoticeable to the operator.

Other arrangements that are not specifically illustrated are intended to fall within the scope of the invention. For example, controller 264 may be a dedicated controller programmed to perform one function: to control the wheel steering of the vehicle. Alternatively, controller 264 may be programmed to perform many functions in addition to steering functions. Even further, the functions described as being performed by controller 264 may be performed by two or more controllers that are interconnected to share data. These interconnections may be high-speed chip level interconnections in which multiple processors are connected by an address/control/data bus. The interconnections may alternatively be slower network-type interconnections, such as Ethernet, CAN bus or other serial communications busses. The interconnections may be hardwired. The interconnections may be optical using optical fibers. The interconnections may also be provided by radio from processor to processor. The interconnections may be serial or they may be parallel.

A single controller may be provided that performs the functions of both controllers 244 and 264 to both skid steer the vehicle (per controller 244) and steer the wheels to reduce or eliminate skidding (per controller 264).

The speed of the wheels or motors need not be determined by speed sensors located at the wheels or motors. Instead, controller 264 may be configured to determine the speed of the wheels by monitoring the position of the input devices, monitoring the pump displacement, monitoring the flow rate to the motors, monitoring the displacement of the motors (when variable displacement motors are used) or by receiving data from controller 244 that indicates the speed of the vehicle, the wheels, the motors, the position of the input devices, the flow rate of fluid through the motors or the pumps, or the displacement of the pumps or motors. Since controller 244 determines the position of the levers, controller 264 can be coupled to controller 244 to receive such data, from which controller 264 can determine the paths of wheel travel and hence the preferred steering angle.

While the embodiment illustrated herein shows a digital microprocessor as controller 244 to control the speed of the wheels, the system need not require a microprocessor. In another configuration, controller 264 can be or include hydraulic, pneumatic, or mechanical circuits to connect the input devices to the pumps instead of or as a supplement to controller 244.

In the illustrated embodiment, a single motor is shown driving the wheels on each side of the vehicle. In an alternative embodiment, each wheel is provided with and is driven by its own motor. In this embodiment, the motors on each side of the vehicle are constrained to operate at the same speed and in the same direction by being connected in series with the pump for that side.

In the illustrated embodiment, the operator manipulates a switch to engage and disengage the steering controller. The switch may be a mechanical, electrical, pneumatic, hydraulic, or optical switch. It may be a touch screen switch. It may be formed as two switches, one for engaging, and one for disengaging. It may be voice-activated. It may be motion activated.

From the foregoing, it will be observed that numerous modifications and variations can be effected without departing from the true spirit and scope of the novel concept of the present invention.

It will be appreciated that the present disclosure is intended as an exemplification of the invention, and is not intended to limit the invention to the specific embodiment illustrated. The disclosure is intended to cover by the appended claims all such modifications as fall within the scope of the claims.

I claim:

1. A steering control system for a skid steer vehicle having wheels comprising:
   means for skid steering the wheels of the skid steer vehicle in a skid steering mode of operation; and
   means for wheel steering the wheels of the skid steer vehicle in a wheel steering mode of operation;
   wherein the means for wheel steering responds to the speeds of the wheels in order to determine a preferred angle of wheel steering.

2. The system of claim 1, wherein the means for wheel steering includes means for sensing the speed of the wheels.

3. The system of claim 2, wherein the means for sensing the speeds of the wheels includes means for determining the speed of at least one wheel on one side of the vehicle and for sensing a different speed of another wheel on an opposing side of the vehicle.

4. The system of claim 3, wherein the means for wheel steering includes a means for determining a preferred angle of steering, wherein the preferred angle of steering reduces the amount of wheel skidding that would otherwise be provided by the means for skid steering, and further wherein the means for determining a preferred angle of steering is based upon data derived from, or indicative of, the speed of the at least one wheel and the different speed of another wheel.

5. The system of claim 4, wherein the means for skid steering includes means for driving both left wheels in the same direction at the same left wheel speed, and means for driving both right wheels in the same direction at the same right wheel speed, and means for driving the left and right wheels in the same direction and in different directions, and for driving the left and right wheels at the same speed and at different speeds, all while said left and right wheels are pointed straight ahead.

6. The system of claim 5, wherein the vehicle can make turns including both left turns and a right turns in the wheel steering mode and further wherein the means for wheel steering include means for steering the wheels on the inside of the turns to a greater steering angle than the wheels on the outside of the turns.

7. The system of claim 6, wherein the difference in the steering angle of the inside wheels and the steering angle of the outside wheels is determined by a digital microcontroller and is based upon data indicative of the difference in speed between wheels on one side of the vehicle and wheels on the other side of the vehicle.

8. A skid steer vehicle, comprising:
a chassis;
two left wheels mounted in fore-and-aft relation to the left side of the chassis and operable to skid steer the vehicle when disposed in a straight-ahead position;
means for wheel steering the two left wheels;
a left side hydraulic motor drivingly coupled to the two left wheels;
two right wheels mounted in fore-and-aft relation to the right side of the chassis and operable together with said two left wheels to skid steer the vehicle when disposed in a straight ahead position;
means for wheel steering the two right wheels;
a right side hydraulic motor drivingly coupled to the two right wheels;
a drive controller configured to drive and skid steer the vehicle in a skid steer mode of operation; and
a steering controller configured to:
(1) receive signals indicative of left wheel speed,
(2) receive signals indicative of right wheel speed,
(3) calculate desired steering angles from the left and right wheel speeds, and
(4) steer the four wheels to those steering angles.

9. The skid steer vehicle of claim 8, further comprising means for switching that is configured to engage and disengage the steering controller.

10. The skid steer vehicle of claim 9, wherein the drive controller is configured to skid steer the vehicle when the steering controller is disabled.

11. The skid steer vehicle of claim 9, wherein the steering controller is configured to automatically return the wheels to a straight-ahead position when the steering controller is disabled.

12. The skid steer vehicle of claim 9, further comprising a left operator input device coupled to the drive controller to drive the left wheels in forward and in reverse, and a right operator input device coupled to the drive controller to drive the right wheels in forward and in reverse.

13. The skid steer vehicle of claim 12, wherein the drive controller has:

(1) a first mode of operation in which he drive controller is configured to drive the wheels on one side of the vehicle forward while simultaneously driving the wheels on the other side of the vehicle in reverse,
(2) a second mode of operation in which the drive controller is configured to drive the wheels on one side of the vehicle forward while simultaneously driving the wheels on the other side of the vehicle in forward, and
(3) a third mode of operation in which the drive controller is configured to drive the wheels on one side of the vehicle reverse while simultaneously driving the wheels on the other side of the vehicle in reverse.

14. The skid steer vehicle of claim 13, wherein the steering controller is configured to steer all four wheels in the first mode of operation, in the second mode of operation, and in the third mode of operation.

15. The skid steer vehicle of claim 14, wherein the first second and third modes of operation are selectable by at least one operator input device.

16. The skid steer vehicle of claim 15, wherein the steering controller receives and is responsive to the signals indicative of left and right wheel speed, and further wherein the operator selects wheel speed by manipulating the first and second operator input devices.

17. The skid steer vehicle of claim 16, wherein the signals indicative of wheel speed indicate (1) operator input device position, (2) pump displacement, (3) motor speed, (4) wheel speed.

18. A steering system for a skid steer vehicle having at least two driven left wheels and two driven right wheels, each of the left wheels and the right wheels having a speed, the steering system including:
a left steering actuator configured to steer the two left wheels;
a right steering actuator configured to steer at two right wheels; and
a digital microprocessor-based controller coupled to the left steering actuator and the right steering actuator configured to determine a steering angle of a left wheel based upon both a left wheel speed and a right wheel speed, and to determine a right wheel steering angle based upon both a left wheel speed and right wheel speed.

19. The steering system of claim 18, wherein the left steering actuator is configured to steer both left wheels the same amount and in opposite directions and the right steering actuator is configured to steer both right wheels the same amount in opposite directions.

20. The steering system of claim 18, wherein the steering controller is configured to steer a left front wheel and a right front wheel in opposite directions when the left wheels and the right wheels rotate in opposite directions.

* * * * *